United States Patent [19]
Jentzsch et al.

[11] Patent Number: 4,724,751
[45] Date of Patent: Feb. 16, 1988

[54] SYSTEM FOR EXHAUSTING AND COLLECTING GASES, IN PARTICULAR MOTOR VEHICLE EXHAUST GASES IN ASSEMBLY OR FACTORY HALLS

[76] Inventors: Horst Jentzsch, Waldenbucher Strasse 9, D-7447 Aichtal; Berthold Schuppler, Haldenweg 37, D-7314 Wernau, both of Fed. Rep. of Germany

[21] Appl. No.: 77,030

[22] Filed: Jul. 21, 1987

Related U.S. Application Data

[63] Continuation of Ser. No. 885,144, Jul. 14, 1986, abandoned.

[30] Foreign Application Priority Data

Jul. 16, 1985 [DE] Fed. Rep. of Germany ....... 3525293

[51] Int. Cl.⁴ .................................................. F23J 11/02
[52] U.S. Cl. .......................................... 98/115.4; 93/49; 104/52
[58] Field of Search ............... 98/115.4, 49; 104/52, 104/146; 180/89.2, 309; 406/113; 285/226

[56] References Cited

U.S. PATENT DOCUMENTS

| | | | |
|---|---|---|---|
| 2,733,668 | 2/1956 | Pfetzing | 98/115.4 X |
| 2,765,752 | 10/1956 | Imming | 104/52 |
| 3,380,371 | 4/1968 | Scheel | 98/115.4 |
| 3,435,752 | 4/1969 | Capstran | 98/115.4 X |
| 3,952,492 | 4/1976 | Miyazaki et al. | |
| 4,086,847 | 5/1978 | Overmyer | 98/115.4 |
| 4,102,254 | 7/1978 | Grant | 98/115.4 |
| 4,287,405 | 9/1981 | Takashi et al. | 219/136 |
| 4,389,923 | 6/1983 | Ludscheit | 98/115.4 |
| 4,505,205 | 3/1985 | Huang et al. | 104/146 |
| 4,539,897 | 9/1985 | Fleischer | 98/115.4 X |

FOREIGN PATENT DOCUMENTS

| | | | |
|---|---|---|---|
| 0012894 | 12/1979 | European Pat. Off. | |
| 0067126 | 4/1982 | European Pat. Off. | |
| 2430439 | 6/1974 | Fed. Rep. of Germany | |
| 2855325 | 12/1978 | Fed. Rep. of Germany | |
| 2747105 | 4/1979 | Fed. Rep. of Germany | 98/49 |
| 1516931 | 1/1976 | United Kingdom | |
| 2010473 | 6/1979 | United Kingdom | 98/115.4 |

*Primary Examiner*—Steven E. Warner
*Attorney, Agent, or Firm*—Lowe, Price, LeBlanc, Becker & Shur

[57] ABSTRACT

An apparatus for exhausting and collecting gases comprising a slotted exhaust conduit fixed in position and provided on its one face with an elastic, axial lip seal for guiding in sealed relationship a suction nozzle of at least one carriage which can be moved in the axial direction along guide sections. The suction nozzle is connected to a hose, and a vacuum is generated in the slotted exhaust conduit through an exhauster. In order to make such a system suited for use in factory halls in which the space above the assembly system and the operating space must remain clear from obstructions in order to permit cranes or assembly installations, or the like, to be positioned and operated in this clear space, the slotted exhaust conduit is arranged below axially movable assembly frames. The carriage can be moved in synchronism with the assembly frames. The lips of the lip seal are directed upwardly and the hose takes the form of a bellows and can be attached to an opening in the assembly frame from below.

10 Claims, 7 Drawing Figures

SYSTEM FOR EXHAUSTING AND COLLECTING GASES, IN PARTICULAR MOTOR VEHICLE EXHAUST GASES IN ASSEMBLY OR FACTORY HALLS

This application is a continuation of application Ser. No. 885,144, filed July 14, 1986 now abandoned.

The present invention relates to a system for exhausting and collecting gases, in particular motor vehicle exhaust gases in assembly or factory halls, comprising a slotted exhaust conduit fixed in position and provided on one face with an elastic, axial lip seal for guiding in sealed relationship a suction nozzle of at least one carriage which can be moved in the axial direction along guide sections, the suction nozzle being connected to a gas line and a vacuum being generated in the slotted exhaust conduit through an exhauster.

A system of this type has been known already from German patent specification No. 28 55 325.

Systems of this type are used for exhausting and collecting gases and exhaust gases where the gas or exhaust gas is to be extracted from a point which changes its position within an assembly or factory hall or the like. Typical applications for such installations are found, for example, in final assembly halls of motor vehicle manufacturers. For, the engines of the motor vehicles are in operation already during the final assembly and inspection so that exhaust gases are emitted from the exhaust pipes of the motor vehicles. At the same time, the motor vehicles are moved through the hall along a conveyor belt. In view of the fact that it would be very costly and, moreover, dangerous, to let the exhaust gases escape first into the hall and to extract them thereafter from the whole space, one connects the hose directly to the exhaust of the respective motor vehicle, using a suitable hose nozzle and clip, and causes the carriages to move along the slotted exhaust conduit as the motor vehicle is moved by the belt. At the end of the belt, the hose is detached from the exhaust, and the carriage is returned to the beginning of the belt by suitable return means.

Systems of this type for use with motor vehicles may be employed also in halls where operating tests are carried out on motor vehicles, as for example at bus depots and repair stations, technical control associations or the like. In these cases, the motor vehicle is also moved within a space that may be closed to a greater or lesser degree, for example for performing axle-to-axle braking tests, and the installation described before permits the exhaust gases to be extracted directly at the point where they are generated.

It goes, however, without saying that the application of installations of this type is by no means restricted to the extraction of motor vehicle exhaust gases but that instead other gases or exhaust gases, including vapors or the like may also be exhausted, just as gases containing fixed suspended particles, such as air mixed with dust, wood chips or the like.

The before-mentioned system known from German patent specification No. 28 55 325 comprises a carriage provided at its upper portion with rollers guided in a guide section which is formed integrally with the slotted exhaust conduit extending below the carriage. The carriage is entrained by the moving object, for example the motor vehicle which is displaced by the conveyor belt.

The known system which is, thus, of the "overhead" type, has been found to be disadvantageous in those applications in which the space above the conveyor belt must be available without any restrictions, for example for moving traveling cranes, for positioning automated production equipment, or the like.

It is, therefore, the object of the present invention to improve a system of the type described above in such a manner that on the one hand the advantages of the mobile extraction of gases are maintained, while at the same time the space above a conveyor belt or the like is freely available without any restrictions.

This objective is achieved according to the invention by an arrangement in which a slotted exhaust conduit is provided below axially movable assembly frames and the carriages can be moved in synchronism with the latter, in which the lips of the lip seal are directed upwardly and in which the line can be attached to an opening in the assembly frame from below.

In this manner, the problem underlying the invention is solved fully and perfectly.

Because of the underfloor arrangement of the exhaust system, the space above the assembly frame is freely available without any restrictions so that the necessary transfer and assembly work can be performed in this area in an absolutely unobstructed manner.

According to a preferred embodiment of the invention, a motor vehicle is arranged on the assembly frame, and the exhaust of the motor vehicle is connected with the opening. This feature offers particular advantages in the final assembly of motor vehicles because the motor vehicles positioned on the assembly frames can be connected to the opening from above before they reach the exhausting section in which the engine is put into operation. Once in this area, the carriages can approach the opening from below automatically and effect in this manner the connection with the slotted exhaust conduit so that no additional assembly work has to be carried out from above. This facilitates the final assembly work quite considerably, also and in particular because the whole space above the assembly frame is available for the assembly work, for the reasons mentioned above.

In a preferred improvement of this variant, the exhaust is connected with the opening via a detachable elbow.

This feature provides the advantage that the, preferably, substantially rigid elbow permits the connection between the exhaust and the opening to be effected in next to no time.

A particularly favorable effect is achieved with this variant when a cavity, which is adapted to be closed, is provided in the assembly frame for receiving the elbow. This feature offers the advantage that each assembly frame contains everything necessary to conneqt the exhaust of the motor vehicle to the opening so that, when needed, the elbow only has to be taken from the cavity and to be assembled while dismantling is equally simple when the motor vehicle leaves the assembly frame. In this case, the elbow can be placed simply into the cavity where it is available for the next assembly cycle and the next motor vehicle.

According to a preferred embodiment of the invention, the opening is connected over a plurality of junction conduits with a plurality of openings which are distributed over a section of the assembly frame and which are open only at the top and adapted for being closed by means of covers.

This feature provides the advantage that one and the same assembly frame can be used for different motor vehicle models which have the exhaust arranged in different positions. Depending on the model assembled at any given time, the exhaust can then be connected with one of the opening while the other openings remain closed by the covers. This feature, therefore, increases the flexibility of the final assembly system.

In other embodiments of the invention it is, however, als possible, to use a servo mechanism for connecting the bellows with the opening.

Still other embodiments of the invention are characterized by an arrangement in which a pipe adapted for limited vertical displacement is arranged in the opening.

This feature is of particular advantage when the motor vehicles are jacked up on the assembly frame so that the wheels are spaced a certain distance from the surface of the assembly frame. When such an assembly frame with a motor vehicle jacked up thereon enters a performance test stand, the assembly frame is lowered and the wheels get into contact with the rollers of a roller test stand, through openings in the assembly frame. This lowering of the assembly frame increases the distance between the latter and the exhaust, while the distance of the exhaust from the slotted exhaust conduit remains constant. The relative movement of the assembly frame with respect to the exhaust and the slotted exhaust conduit is, however, compensated by the pipe which is arranged to slide vertically in the opening.

In certain embodiments of the invention, the carriage is entrained by the assembly frame via a rod, lever, hook, or the like.

This feature provides the advantage that due to the rigid connection between the carriage and the assembly frame no costly arrangements are necessary in the area of the connection of the bellows to the opening because the position of these two elements relative to each other remains unchanged.

Preferably, the entraining means are provided with an overload coupling which detaches the carriage from the assembly frame when the carriage is braked to a predetermined degree.

This feature provides the advantage that in case of trouble, for example when the carriage runs up against a preceding carriage, no damage will occur because the carriage which has run up against the other one and has been stopped by the latter will release the assembly frame automatically.

The carriage may, preferably, be provided with a lever which engages a matching recess in the assembly frame by its one end for entraining the carriage and which, when doing so, performs a pivoting movement by which the other end of the lever which is connected with the bellows is moved towards the opening of the assembly frame.

This feature distinguishes itself by exceptional simplicity because the carriage is entrained and the closing movement of the bellows towards the opening is performed without the aid of any external forces.

According to other preferred embodiments of the invention, the carriage comprises means for displacing the suction nozzle vertically between a lower waiting position and an upper coupling position.

This feature offers the advantage that coupling of the nozzle with the gas-carrying line of the assembly frame can be effected without any flexible connection means, such as a bellows, and that, accordingly, a rigid entraining connection is obtained between the assembly frame and the carriage.

According to a preferred improvement of this variant, the said means are designed as a four-bar linkage with the aid of which the suction nozzle can perform a motor-driven pivoting movement while the axial direction of an upper counter-pipe projecting from the suction nozzle is not changed at all.

This feature offers the special advantage that the suction nozzle can be coupled with the assembly frame in an inclined position from below, simply by the before-described motor-driven pivoting movement, which facilitates the different movements between the axially moving assembly frame and the carriage which is still in a stationary position during the coupling operation, because the pivoting movement of the carriage has a component in the traveling direction—a condition which is not fulfilled when the nozzle is approached vertically from below by means of a bellows.

According to a further improvement of this variant, the counter-pipe abuts in its upper coupling position flush against a pipe projecting from the opening of the assembly frame.

This feature provides the advantage that the pipes need not be "threaded" into each other, thus minimizing the risk that the pipe may miss the counter-pipe when approaching the coupling position.

A particularly preferred arrangement is obtained in the case of this variant when the pipe and the counter-pipe are provided each with a semi-cylindrical collar forming a rim about half of the periphery of the pipe and the counter-pipe, respectively, and forming together in the upper coupling position a cylindrical sleeve embracing the butt joint between the pipe and the counter-pipe.

This feature first of all offers the advantage that a very good sealing effect is achieved which is absolutely sufficient for normal applications because, as is generally known, a vacuum prevails in the pipe and the counter-pipe so that it is practically impossible for the exhaust gases to escape through the connection between the pipe/counter-pipe and the sleeve. Another material advantage of this feature lies in the fact that the semi-cylindrical collar arranged on the pipe of the assembly frame forms at the same time mechanical entraining means for the carriage because the part of the collar projecting beyond the face of the pipe engages half of the periphery of the counter-pipe and acts to entrain the latter.

In certain embodiments of the invention employing a laterally movable suction nozzle the carriage and the assembly frame are equipped with approximation sensors which respond to each other and interact with each other in such a manner that when the assembly frame approaches the carriage, the said interaction commences a short distance before the position is reached where the pipe is in alignment with the counter-pipe, and causes the four-bar linkage to move into its upper coupling position by means of a control circuit, whereas the interaction ends again a short way behind this position so that the four-bar linkage is then returned to its lower waiting position.

This feature offers the advantage to provide particularly efficient synchronization of the different movements. Due to the fact that the area of interaction extends over a certain axial path, viewed in the travelling direction of the assembly frame and the carriage, it is ensured that the signal to move the four-bar linkage up into its coupling position is supplied to the control circuit early enough so that the upper coupling position is reached by the suction nozzle at the very moment when the pipe of the assembly frame is in alignment with the counter-pipe of the carriage. If, however, some sort of trouble causes the carriage to release the assembly frame, the four-bar linkage will move down again automatically, and the carriage will return to its rest position.

This variant preferably can be further improved by providing that the control circuit, when the four-bar linkage has moved back to its lower position, switches on a drive motor of the carriage for hunting the disengaged assembly frame. This feature provides the advantage that in cases where the assembly frame has lost its contact with the carriage unwantedly and the four-bar linkage has returned to its waiting position as a result thereof, the carriage, by switching on the drive motor, can be caused to travel at a higher speed than the assembly frame and to hunt the assembly frame until the approximation sensors come to interact again and a new contact can be established. If the assembly frame cannot be caught, the carriage can wait for and engage the next free assembly frame.

The same applies analogously in case an attempt to couple a carriage and an assembly frame should fail because of some fault or trouble. In this case, the carriage also leaves the area of interaction between the approximation sensors, and coupling may still be rendered possible by hunting the assembly frame.

According to a preferred embodiment of the variants just described, the approximation sensors are designed as a reflecting photoelectric cell on the carriage and as an elongated reflector on the assembly frame, extending in the traveling direction.

This feature provides the advantage that particularly simple and reliable elements can be used and that the length of the active area can be adjusted easily by proper selection of the size and length of the reflector.

Other advantages of the invention will become apparent from the following description and the attached drawing.

It goes without saying that the features which have been described before and which will be mentioned hereafter may be employed not only in the described combination, but also individually or in any other combination without leaving the scope of the present invention.

Certain embodiments of the invention will be described hereafter in detail with reference to the drawing in which.

Figure 1:
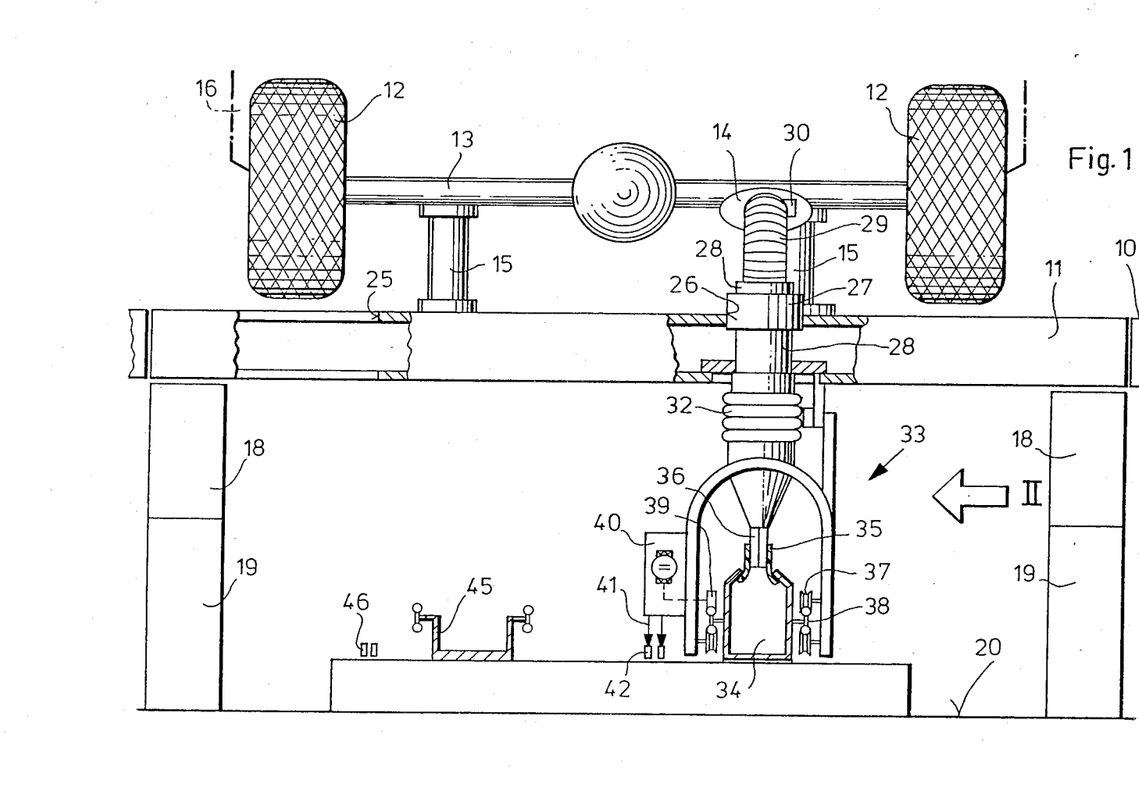
FIG. 1 is a diagrammatic general view, taken in the axial direction, of an assembly frame comprising a system according to the invention.

In FIG. 1, a floor of an assembly or a factory hall is designated by 10. Assembly frames 11 mounted flush with the said floor 10 can be moved in a plane vertical to the representation of FIG. 1. On the assembly frame 11 there can be seen wheels 12, a rear axle 13, an exhaust 14 and supports 15 for jacking up a motor vehicle 16.

Instead of the assembly frame 11, it would of course be similarly possible to provide other conveying means, such as a chain conveyor, an assembly line, or the like.

The assembly frame 11 is moved by transport means 18 engaging the longitudinal sides of the assembly frames from below and mounted on bases 19 which rest in turn on a lower floor 20. It is understood that several such floors 10, 20 may be provided in such assembly or factory halls at different levels above each other.

As indicated by the supports 15, the motor vehicle 16 is jacked up on the assembly frame 11 so that the wheels 12 are spaced a small distance from the upper face of the assembly frame 11. The wheels 12 are positioned above openings 25 through which they can be brought into contact with the rollers of a roller test stand for dynamometer tests.

An additional passage opening 26 containing a pipe 27 in fixed relationship is provided in the rear marginal portion of the assembly frame 11. The pipe 27 includes a concentric connection pipe 28 which can be displaced axially within certain limits. The upper end of the connection pipe 28 is connected with an elbow 29 whose other end is connected with the exhaust 14 by means of grippers 30.

The lower end of the connection pipe 28 is connected with a bellows 32 mounted on a carriage 33 which can be displaced together with the assembly frame 11. During this displacement, the carriage 33 is moved axially along a slotted exhaust conduit 34 comprising an axially continuous, upwardly directed, elastic lip seal 35 in which a lens-shaped suction nozzle 36 is guided in sealed relationship.

The carriage 33 is equipped with rollers 37 by which it is guided on guide rails 38 on the slotted exhaust conduit 34. One of the rollers 37 is designed as a driving roller 39 coacting with a drive 40, preferably a d.c. motor. The supply of the drive 40 is ensured by collector shoes 41 provided on the carriage 33 and coacting with contact rails 42 extending beside the slotted exhaust conduit 34.

A return rail 45, likewise accompanied by contact rails 46, extends in parallel to the slotted exhaust conduit 34.

In the simplified representation of FIG. 2, one recognizes the carriage 33 in a transfer station 49 which will be described in greater detail further below, in connection with FIG. 3.

Figure 2:
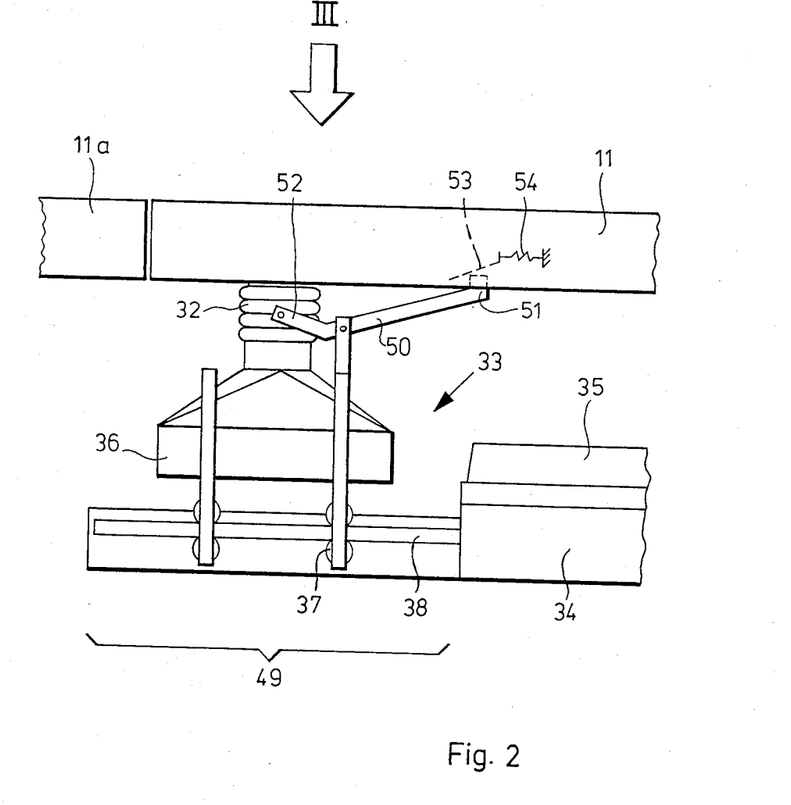
FIG. 2 is a simplified representation, viewed in the direction of arrow II in FIG. 1.

The frame of the carriage 33 of the embodiment shown in FIG. 2 is equipped with a two-armed lever 50 whose one end 51 engages a recess in the assembly frame 11 not shown in detail in FIG. 2. The second end 52 of the lever 50 is connected with the bellows 32.

Inclined guiding means 53 and a spring 54 are indicated by broken lines in the assembly frame 11.

When a carriage 33 is in the waiting position and an assembly frame 11 approaches, the lever 50 is still in a position a little displaced in counter-clockwise direction, relative to the position shown in FIG. 2. Now, the first end 51 of the lever 50 is caught by the assembly frame 11, and the inclined guide 53 causes the lever 50 to be rotated a little in counter-clockwise sense. As a result thereof, the second end 52 moves upwards, and the bellows 32 is urged tightly against the connection pipe 28.

The spring 54 is meant to indicate an overload coupling which, when the carriage 33 is braked excessively, for example when it runs up against an obstacle, causes the first end 51 to be disengaged from the assembly frame 11, and the second end 52 to be lowered again.

Figure 3:
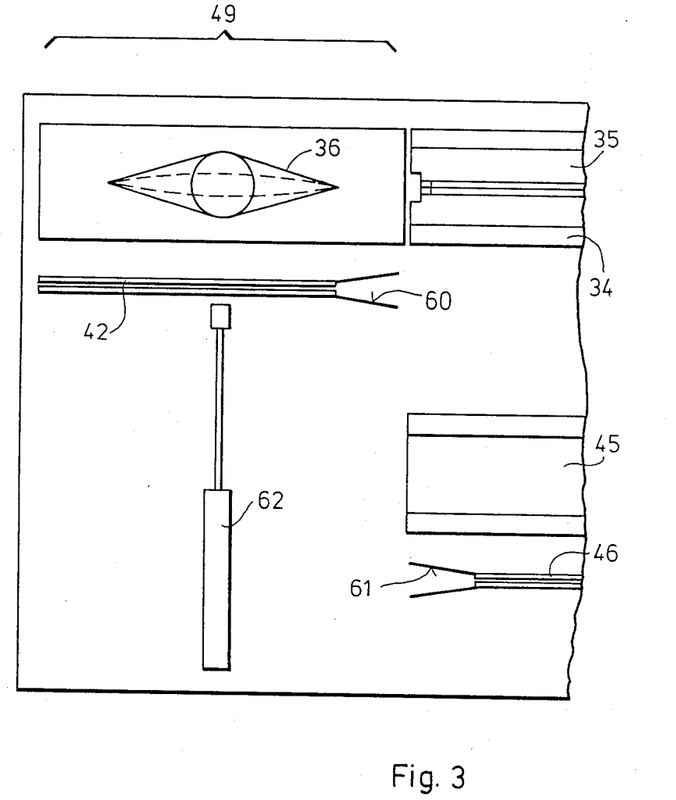
FIG. 3 is a still further simplified representation, viewed in the direction indicated by arrow III in FIG. 2.

In FIG. 3, which shows a top view of the arrangement shown in FIG. 2, it can be seen that the transfer station 59 is provided with transfer means 62, such as a pneumatic conveyor or the like.

The carriages travelling on the return rail 45 can advance, thanks to their drive 40, right into the area of the transfer station 49 where they are gripped by the transfer means 62 and moved into alignment with the slotted exhaust conduit 34. As has been explained already in connection with FIG. 2, they are gripped in this position, and entrained, by the assembly frame 11 arriving next. At the opposite end of the slotted exhaust conduit 34, the carriage 33 is disengaged from the assembly frame 11, by suitable guides or the like, and is transferred to the return rail 45 by second transfer means.

In order to render it easier for the collector shoe 41 to ride on and off the contact rails 42, 46, the latter are provided with entry funnels 60, 61.

It goes without saying that the two-armed lever 50 shown in FIG. 2, which serves to move the bellows 32, may be replaced also by some externally driven means, for example a pneumatic drive, a lifting magnet, or the like, in which case the carriage 33 may be supplied with the necessary current in the entraining position from the contact rails 42.

Figure 4:
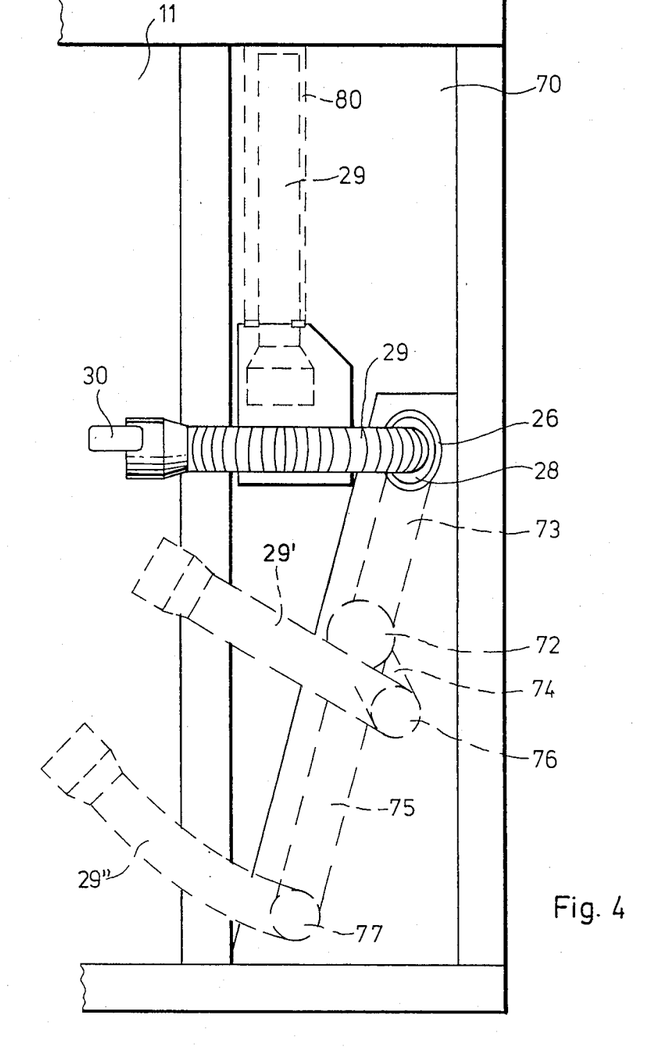
FIG. 4 is a top view of one end of an assembly frame.

FIG. 4 shows a variant where the assembly frame 11 comprises a cavity 80 that can be closed, for accommodating the elbow 29.

The assembly frame 11, therefore, contains everything necessary for connecting the exhaust 14 of the motor vehicle 16 with the opening 26 so that the elbow 29 can be taken from the cavity 80 and mounted, when needed, and detached later in the same simple manner when the motor vehicle 16 leaves the assembly frame 11. The elbow 29 can then simply be placed again in the cavity to be available for the next motor vehicle and the next assembly cycle.

FIG. 4 shows in addition that an opening 72 may be connected via a plurality of junction conduits 73, 74, 75 with a plurality of openings 26, 76, 77 which are distributed over a certain section 79 of the assembly frame and which are open only on their upsides and can be closed by suitable covers.

This permits one and the same assembly frame 11 to be used for different motor vehicle models which have the exhaust 14 arranged in different positions. The exhaust 14 can be connected in this case with one of the openings 26, 76, 77, depending on the particular model to be assembled, while the other openings remain closed by their covers.

Figure 5:
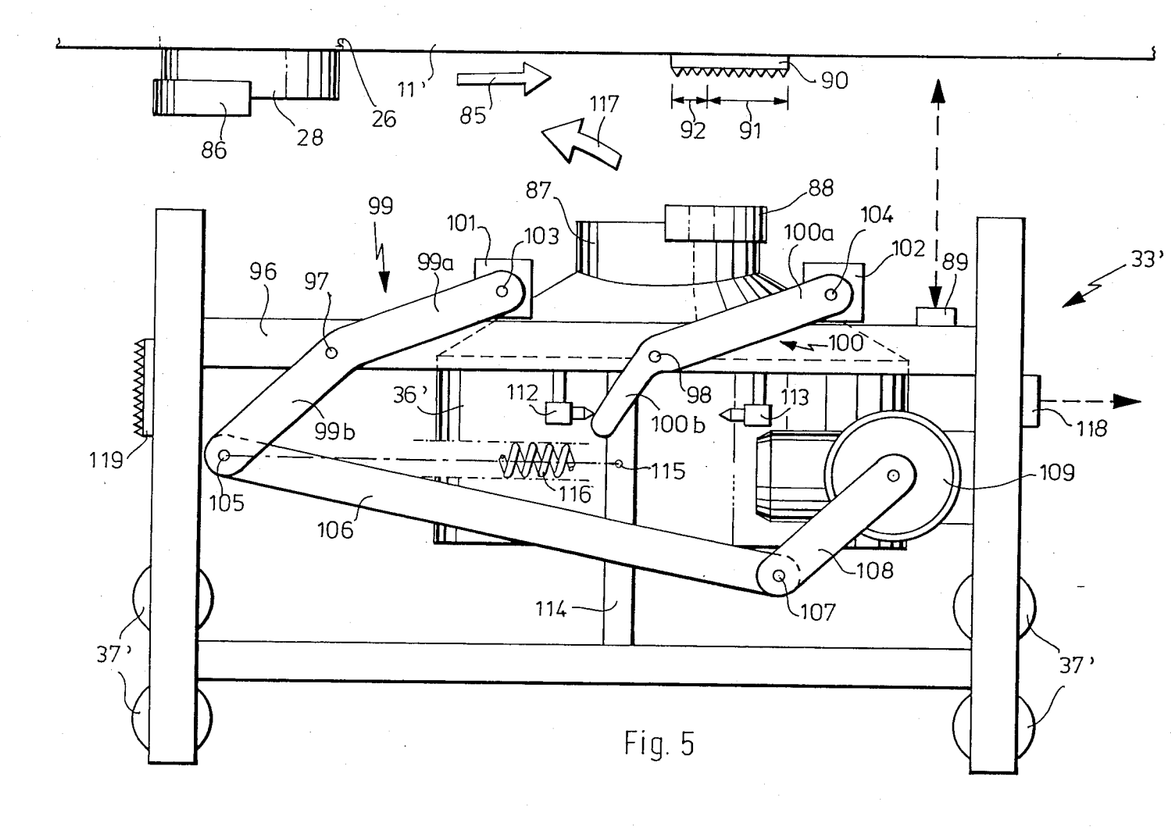
FIG. 5 is a side view of a carriage of a different embodiment of the invention, with the carriage in the waiting position.
Figure 6:
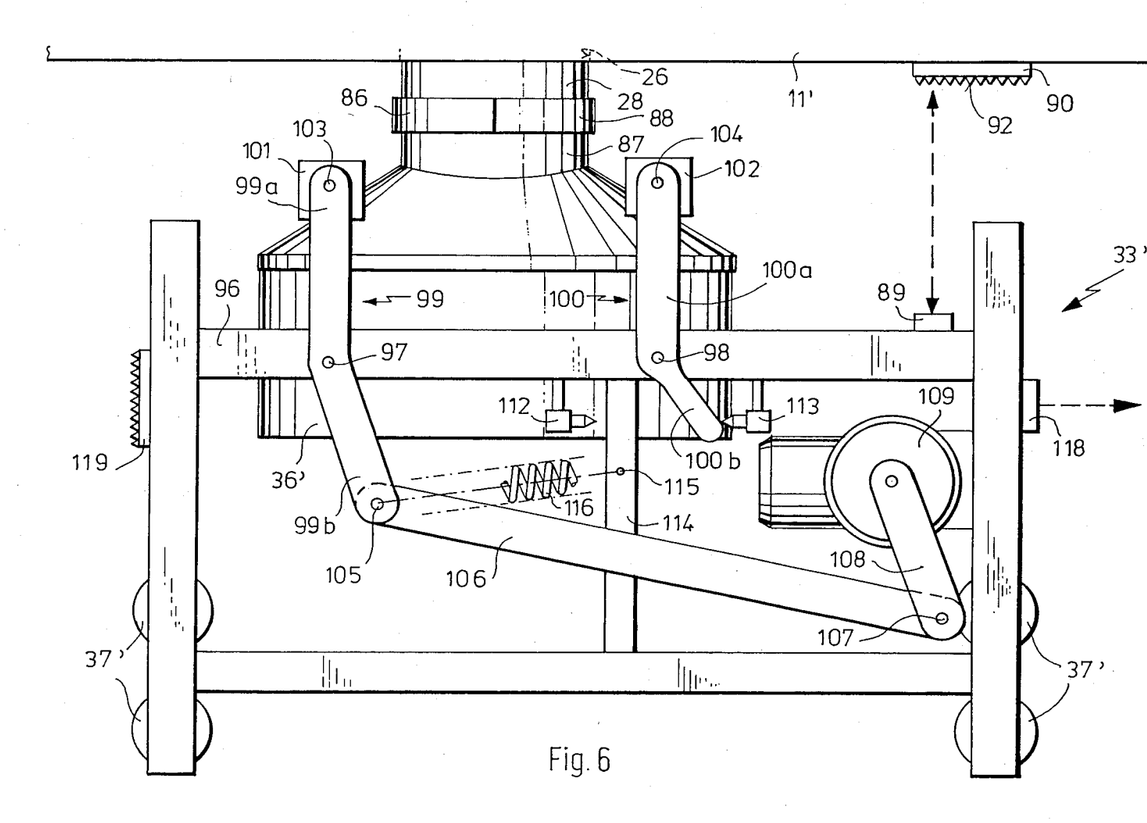
FIG. 6 is a representation similar to that of FIG. 5, but with the carriage in the coupling position.

While in the embodiment described before, coupling of the suction nozzle with the connection pipe 28 in the assembly frame 11 was effected by means of a vertically adjustable bellows 32 which was displaced in the vertical direction while the suction nozzle 36 remained fixed in its vertical position, another variant is employed in the embodiments shown in FIGS. 5 and 6. In these figures, an apostrophe is affixed to the reference numerals designating corresponding parts.

In the upper halves of FIGS. 5 and 6, part of the assembly frame 11' can be seen which moves above the carriage 33' in the direction indicated by arrow 85.

The lower end of the connection pipe 28 provided on the assembly frame 11' carries a semi-cylindrical collar 86 which projects beyond the lower face of the connection pipe 28 and opens in the form of a semi-circle in the direction of movement, i.e. in the direction indicated by arrow 85.

The carriage 33' carries a corresponding counter-pipe 87 which likewise is provided with a semi-cylindrical collar 88 whose open side points into a direction opposite to that of the semi-cylindrical collar 86.

The carriage 33' is further equipped with a first reflecting photoelectric cell 89 adapted to interact with a reflector 90 provided on the underside of the assembly frame 11'. The reflector 90 comprises a front portion 91 and a rear portion 92, viewed in the travelling direction (arrow 85) of the assembly frame 11'.

A cross member 96 of the carriage 33' extending in the travelling direction carries two axially spaced joints 97, 98 for two-armed levers 99, 100. The upper arms 99a, 100a of the levers 99, 100 are pivoted on flanges 101, 102 of the suction nozzle 36' by means of joints 103, 104. The upper arms 99a, 100a therefore form together with the suction nozzle 36' and the cross member 96 a four-bar linkage comprising the joints 97, 98, 103, 104.

The four-bar linkage is actuated by a link 106 connected by its one end with the lower end of the lower arm 99b of the lever 99 by means of a joint 105, and by its other end, via a joint 107, with a crank 108 which can be rotated by means of a coupling motor 109 in a plane parallel to the four-bar linkage. The coupling motor 109 is mounted on the carriage 33'.

The lower arm 100b of the lever 100 interacts with two limit switches 112, 113.

A helical spring 116 is fixed by its one end at a joint 115 provided on another cross member 114 of the carriage 33', while its opposite end acts upon the joint 105 at the lower end of the lower arm 99b of the lever 99.

The elements just described make it possible to move the four-bar linkage together with the suction nozzle 36' is the manner described further below, from the waiting position shown in FIG. 5 in the direction indicated by arrow 117 in FIG. 5, into the coupling position shown in FIG. 6, during which process the helical spring 116 is relaxed.

Figure 7:
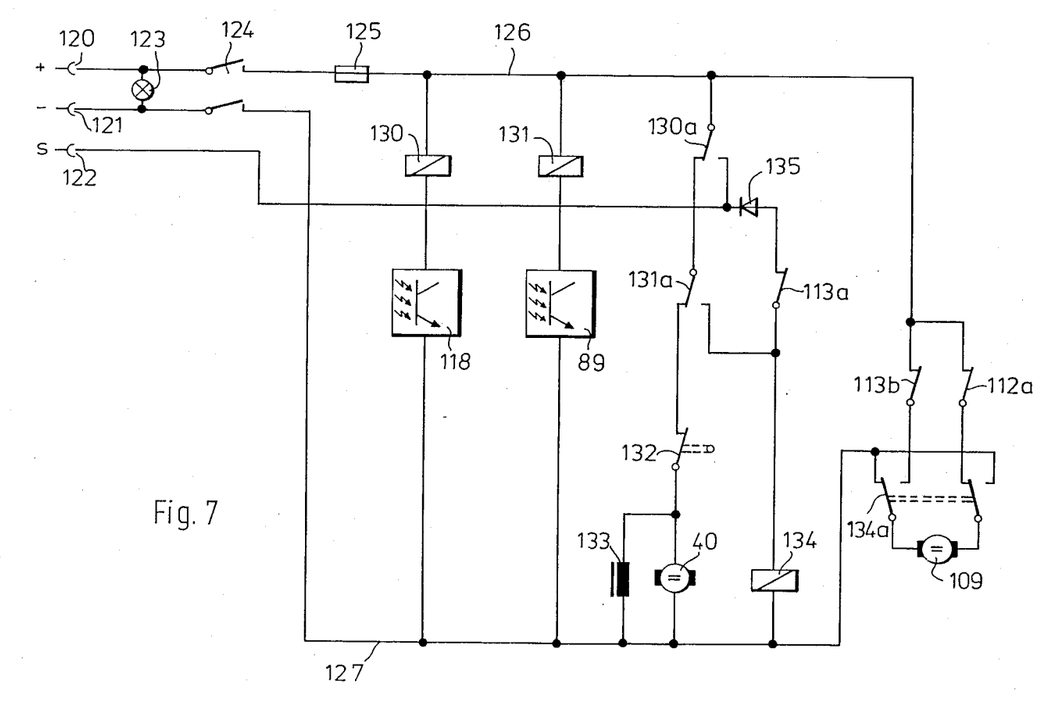
FIG. 7 is a circuit diagram of a control circuit of the type that may be used in the embodiments shown in FIGS. 5 and 6.

The different driving and adjusting elements of the carriage 33' may be controlled by a control circuit of the type represented by way of example in the circuit diagram of FIG. 7.

In the circuit diagram shown in FIG. 7, three current-carrying rails, to which the carriage 33' is connected via suitable collector shoes or sliding contacts, are indicated by a positive connection 120, a negative connection 121, and a signal connection 122. A luminous operating signal 123 is connected between the current-carrying connections 120, 121, and a master switch 124 is provided for connecting the current-carrying connections 120, 121 with a positive line 126 or a negative line 127 of the control circuit, via an automatic cut-out 125.

Between the lines 126, 127, there are connected firstly a series connection consisting of a first relay coil 130 and the second reflecting photoelectric cell 118, and secondly a series connection consisting of a second relay coil 131 and the first reflecting photoelectric cell 89. Another series connection consisting of a change-over switch 130a actuated by the said first relay coil and a change-over switch 131a actuated by the second relay coil 131 leads from the positive line 126 over a waiting-position switch 132 to a parallel connection comprising the drive motor 40 of the carriage 33' and an actuating magnet 133 for the driving roller 39. These parts are insofar identical in the embodiment shown in FIGS. 5 and 6 to the corresponding elements shown in FIG. 1. The drive motor 40 and the actuating magnet 133 are connected by their other ends to the negative line 127. The other contact of the change-over switch 130a leads to the signal connection 122 and to the cathode of a diode 135 whose anode leads via a switching contact 113a of the limit switch 113 to the other contact of the change-over switch 131a and via a third relay coil 134 to the negative line 127. Finally, there are connected to the positive line 126 a second switching contact 113b of the limit switch 113 and a switching contact 112a of the limit switch 112 which lead to contacts of a two-pole change-over switch 134a which is actuated by the third relay coil 134 and which has its other switching contacts connected to the coupling motor 109.

The operation of the carriage 33' according to FIGS. 5 and 6, as actuated by the control circuit shown in FIG. 7, is as follows:

FIG. 5 shows the waiting position of the carriage 33'. The four-bar linkage 36', 96, 99a, 100a is in its lower position in which the lower arm 100b of the lever 100 operates the lower limit switch 112. The first reflecting photoelectric cell 89 has no connection with the reflector 90. This means that when the master switch 124 is in the closed position the path via the first reflecting photoelectric cell 89 is blocked and the second relay coil 131 is not excited.

The second reflecting photoelectric cell 118 with its associated reflector 119 provided at the rear of the preceding carriage serves to permit the carriages 33' to approach each other very closely, until a minimum residual distance is reached, as described in detail in the prior patent application No. P 34 33 602 filed by the same applicant, where the control of the drive motor, its arrangement and the like, are also described in detail. The disclosure of that patent application is herewith incorporated into the disclosure of the present application by reference.

If no other carriage is present immediately in front of the carriage 33', the second reflecting photoelectric cell 118 does not respond, so that the first relay coil 130 is not excited.

When the carriage 33' is in a waiting position of the system according to the invention, then the waiting-position switch 132 arranged at the carriage 33'—but not shown in the drawing—will be actuated by an actuating cam or the like provided in a fixed position—but likewise not shown in the drawing—so that the corresponding switching contact in FIG. 7 is open and, accordingly, neither the drive motor 40 nor the actuating magnet are excited.

Now, when an assembly frame 11' approaches in the direction indicated by arrow 85—as shown in FIG. 5—the front portion 91' of the reflector 90 enters in a first phase a position above the first reflecting photoelectric cell 89 in which the connection pipe 28 is, however, not yet in alignment with the counter-pipe 87. However, due to the interaction between the first reflecting photoelectric cell 89 and the reflector 90, the second relay coil is now excited and the change-over switch 131a a switched over. As a result, the third relay coil 134 is now supplied with current via the change-over contact 131a, which is still closed, and causes the two-pole change-over contact 134a to change over into the position not shown in FIG. 7. Since, as mentioned before, the carriage 33' was up to that point in time in the waiting position shown in FIG. 5, the lower limit switch 112 was operated and its associated switching contact 112a was opened. Consequently, the coupling motor 109 was dead.

Now, after the two-pole switching contact 134a has been switched over, the coupling motor 109 is supplied with current via the closed switching contact 113b of the upper limit switch 113 so that the crank 108 turns, thereby moving the four-bar linkage 36', 96, 99a, 100a, via the link 106, in the direction indicated by arrow 117 in FIG. 5.

Giving due consideration to the travelling speed of the assembly frame 11, the angular speed of the coupling motor 109 and the dimensions of the different joint elements are sized in such a manner that the counter-pipe 87 of the suction nozzle 36' gets into alignment with the connection pipe 28 of the assembly frame 11 exactly at the moment when the first reflecting photoelectric cell 89 is positioned precisely below the rear portion 29 of the reflector 90. This upper coupling position is shown in FIG. 6. When this coupling position is reached, the lower arm 100b of the lever 100a actuates the limit switch 113 so that the switching contact 113b is opened. The switching contact 112a of the lower limit switch 112 had closed at the moment when the lower arm 100b was lifted off the lower limit switch 112. As a result of the opening of the switching contact 113b, the coupling motor 109 is cut off from the current supply, and stops in the coupling position shown in FIG. 6. However, as the first reflecting photoelectric cell 89 remains still in interactive relation with the reflector 90, the second relay coil 131 remains excited so that the third relay coil 134 remains excited, too, and retains the two-pole change-over contact 134a in the position not shown in FIG. 7.

During the lifting motion of the suction nozzle 36', the switching contact 113a of the upper limit switch 113 was closed and positive voltage was allowed for a short time by the switching contact 130a and the switched-over contact 131a to reach the signal connection 122 via the diode 135. However, when the upper coupling position shown in FIG. 6 was reached and the upper limit switch 130 was operated, the switching contact 113a was opened again so that the positive signal that had appeared at the signal connection 122 disappeared again. This voltage pulse occurring during the lifting movement of the suction nozzle 36' can, therefore, be used as an indication of possible malfunctions of the arrangement, because in case the suction nozzle 36' should be stopped, for example, halfway between the waiting position and the coupling position because of a mechanical fault, a continuous signal will be encountered at the signal connection 122 which can be distinguished clearly by suitable time-control circuits from the short voltage pulse encountered in normal operation.

The carriage 33' now entrains the assembly frame 11' from the coupling position shown in FIG. 6, as the semi-cylindrical collar 86 of the connection pipe 28 engages the rear (viewed in the travelling direction) of the counter-pipe 87, thus establishing a form-locking connection by which the carriage 33' is entrained.

The carriage is entrained against the action of the helical spring 116 which had to be tensioned when the suction nozzle was lowered.

In this manner, the carriage 33' can be entrained by the assembly frame 11' over any desired distance, so long as the first reflecting photoelectric cell 89 remains in interactive relation with the reflector 90. So long as this is the case, the drive motor 40 and the actuating magnet 133 remain switched off so that the carriage 33' is not braked by any electrically connected and/or mechanically coupled drive.

In case of trouble, however, a condition may arise in which the assembly frame 11' is disengaged from the carriage 33' during the travelling motion, in which case the carriage will fall behind the assembly frame 11, being no longer retained in form-locking engagement by the collar 86. As a result, the first reflecting photoelectric cell 89 gets out of contact with the reflector 90 which means that the second relay coil 131 is deenergized and the switch-over contact 131a returns to the position shown in FIG. 7.

This results on the one hand in the third relay coil 134 being deenergized, whereby the two-pole switch-over contact 134 is returned to the position shown in FIG. 7 and the coupling motor 109 starts to run in the opposite sense of rotation, and the suction nozzle 36' returns downwarly into the waiting position shown in FIG. 5, with the helical spring 116 being tensioned simultaneously.

However, since the switching contact 131a has returned to its original position, current is now supplied also to the drive motor 40 and the actuating magnet 133 so that the drive motor 40 is switched on and sets the carriage 33' into motion by coupling the driving roller 39 mechanically with the guide section 38. Now, the driving speed of the carriage 33' is selected to be higher than the travelling speed of the assembly frame 11' which means that the carriage 33' starts hunting the assembly frame 11' until the interactive contact between the reflecting photoelectric cell 89 and the reflector 90 is re-established. In this case, the cycle described before starts anew, the drive of the carriage 33' is switched off mechanically and electrically, and a new coupling maneuver is initiated.

In case the attempt at hunting the assembly frame 11' should fail, too, then the carriage 33' can wait for and engage the next assembly frame 11'.

The same applies of course analogously in case the coupling maneuver should have failed already in the waiting position.

In case the carriage 33' should run up against the preceding carriage, the second reflecting photoelectric cell 118 is switched through, the second relay coil 130 is excited, and the switching contact 130a of this coil is switched over from the position shown in FIG. 7. This causes on the one hand a signal to appear at the signal connection S and, on the other hand, the drive motor 40 and the actuating magnet 133, as well as the third relay coil 134, to be cut off so that the carriage 33' is stopped completely until the distance to the preceding carriage has been re-established.

We claim:

1. Apparatus for exhausting and collecting motor vehicle exhaust gases in a factory hall comprising:
   longitudinal transportation means for displacing a plurality of assembly frames, said transportation means being mounted on the floor of said hall;
   at least one assembly frame mounted on said transportation means;
   motor vehicle support means for supporting a vehicle on said assembly frame in an elevated position;
   a pipe connecting and extending between an upper surface and a lower surface of said assembly frame;
   first tubular connecting means for connecting an exhaust of said motor vehicle to said pipe on said upper surface;
   a slotted exhaust conduit mounted below the said assembly frame in a fixed relationship to said floor and extending in a direction parallel to the longitudinal axis of said transportation means, said conduit slot being provided on an upper surface with an axial lip seal;
   an exhauster means coupled ot said conduit for creating an vacuum therein;
   guide means disposed in parallel relationship to said conduit and adjacent thereto;
   a carriage coupled to said guide means, said carriage having suction nozzle penetrating at one end into said axial lip seal of said conduit, and second tubular connection means carried by said carriage and mounted on the opposite end of said nozzle;
   actuating means for displacing said second tubular connecting means from a first nonoperative lower position into a second operating upper position in which said second tubular connecting means is brought into a gas type connection with said pipe on the lower surface of said assembly frame; and
   engaging means for mechanically linking said carriage to said assembly frame, said engaging means cooperating with said actuating means to provide a synchronous transportation of said carriage by said frame when said gas type connection is made.

2. Apparatus according to claim 1, wherein said engaging means includes a rod, a lever or a hook, entraining said carriage by said assembly frame.

3. Apparatus according to claim 2, wherein said engaging means includes an overload coupling means for detaching said carriage from said assembly frame when said carriage is braked to a predetermined degree.

4. Apparatus according to claim 2, wherein said engaging means lever includes a central portion and a first and a second free end, said lever being pivotally mounted on said carriage at said central portion and engaging a matching recess in said assembly frame by said first free end for entraining said carriage and being connected with said second tubular connecting means by said second free end.

5. Apparatus according to claim 1, wherein said actuating means includes a four-bar linkage means for pivoting movement of said second tubular connecting means in an axial direction and a counter-pipe projecting upwardly from said second tubular connecting means.

6. Apparatus according to claim 5, wherein said counter-pipe abuts in said second operative upper position flush against said pipe projecting from said assembly frame.

7. Apparatus according to claim 6, wherein said pipe and said counter-pipe are provided each with a semi-cylindrical collar forming a rim about half of the periphery of said pipe and counter-pipe, respectively, and forming together in said second operative upper position a cylindrical sleeve embracing a but joint between said pipe and said counter-pipe.

8. Apparatus according to claim 5, further comprising approximation sensors coupled to said carriage and said assembly frame, said sensors responding to each other and interacting with each other over a predetermined distance in a travelling direction of said assembly frame or said carriage so that when said assembly frame approaches said carriage, an interaction commences a short distance before a position is reached wherein said pipe is in alignment with said counter-pipe, and causes said four-bar actuating means to move into said operative upper position by means of a control circuit, whereas said interaction ends again a short way behind said position so that said four-bar actuating means is then returned to said first non-operative lower position.

9. Apparatus according to claim 8, further comprising drive motor operably coupled to said carriage and to said control circuit whereby said control circuit, when said four-bar actuating means has moved back to said first nonoperative lower position, switches on said drive motor of said carriage for running past said disengaged assembly frame.

10. Apparatus according to claim 8, wherein said approximation sensors are designed as a reflecting photoelectric cell on said carriage and as an elongated reflector on said assembly frame, respectively, said reflector extending in said travelling direction.

* * * * *